(12) United States Patent
Matsumoto et al.

(10) Patent No.: US 7,543,545 B2
(45) Date of Patent: Jun. 9, 2009

(54) VISUAL RECOGNITION ASSISTANCE APPARATUS FOR VEHICLE

(75) Inventors: Yoshiyuki Matsumoto, Wako (JP); Kazuyuki Maruyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 11/597,052

(22) PCT Filed: Sep. 16, 2005

(86) PCT No.: PCT/JP2005/017551
§ 371 (c)(1),
(2), (4) Date: Jun. 5, 2007

(87) PCT Pub. No.: WO2006/030983
PCT Pub. Date: Mar. 23, 2006

(65) Prior Publication Data
US 2007/0227437 A1    Oct. 4, 2007

(30) Foreign Application Priority Data
Sep. 16, 2004    (JP)    ................ 2004-269738

(51) Int. Cl.
*B60Q 1/48* (2006.01)
*B62D 15/02* (2006.01)
(52) U.S. Cl. ................ 116/28 R; 116/30; 116/35 R
(58) Field of Classification Search ............... 116/28 R, 116/28 A, 30, 35 R; 33/264
See application file for complete search history.

(56) References Cited

U.S. PATENT DOCUMENTS

| | | | |
|---|---|---|---|
| 2,066,641 A | | 1/1937 | Melior et al. |
| 2,360,368 A | * | 10/1944 | Rubissow ................ 33/264 |
| 2,553,963 A | | 5/1951 | Dzus |
| 2,664,634 A | | 1/1954 | Giblin et al. |
| 3,199,487 A | * | 8/1965 | Heinkel .............. 116/28 R |
| 3,434,214 A | * | 3/1969 | Pratt ................... 33/264 |
| 3,858,924 A | * | 1/1975 | Bores .................. 293/117 |
| 3,998,285 A | * | 12/1976 | Cooper ............... 116/28 R |
| 4,677,753 A | * | 7/1987 | Loggers ................ 33/264 |
| 4,737,001 A | | 4/1988 | Moss et al. |
| 5,052,113 A | * | 10/1991 | Aquino ................ 33/264 |
| 5,146,686 A | * | 9/1992 | Brown ................. 33/264 |
| 6,345,587 B1 | * | 2/2002 | Toscano ............... 116/30 |
| 2002/0174822 A1 | * | 11/2002 | Royal ................. 116/28 R |

FOREIGN PATENT DOCUMENTS

| | | |
|---|---|---|
| DE | 41 35 042 C1 | 2/1993 |
| JP | 7-35855 A | 2/1995 |

(Continued)

*Primary Examiner*—R. A. Smith
(74) *Attorney, Agent, or Firm*—Birch, Stewart, Kolasch & Birch, LLP

(57) ABSTRACT

Visual recognition assistance device (10) for a vehicle includes a pole section (11) provided at a corner area of the vehicle, and a plate section (12) provided at an intermediate portion or end portion of the pole section in substantially parallel relation to the ground surface. The plate section is in any one of disk, rectangular, triangular, kite and bar shapes. The plate section includes a pole-section position indicating portion (13) to point to the pole section in a highlighted fashion. The pole-section-position indicating portion may be in the form of a recessed portion, colored portion, light emitting portion, projecting portion or bar.

15 Claims, 5 Drawing Sheets

FOREIGN PATENT DOCUMENTS

| | | |
|---|---|---|
| JP | 10-59100 A | 3/1998 |
| JP | 2003-54334 A | 2/2003 |
| JP | 2003-252121 A | 9/2003 |
| JP | 2004-203130 A | 7/2004 |
| JP | 2005035511 A * | 2/2005 |
| JP | 2006082700 A * | 3/2006 |
| JP | 2007314141 A * | 12/2007 |

* cited by examiner

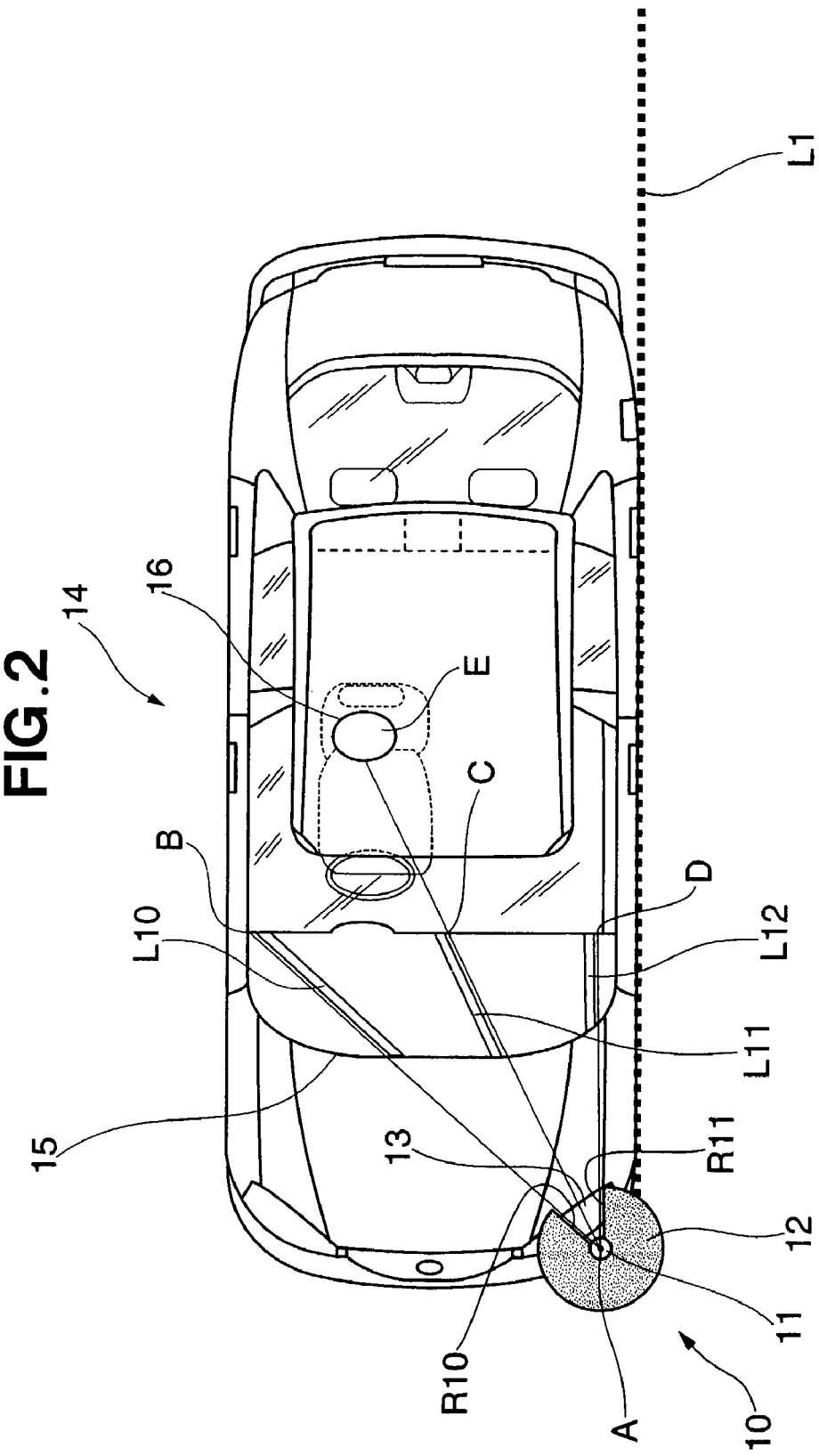

VISUAL RECOGNITION ASSISTANCE APPARATUS FOR VEHICLE

TECHNICAL FIELD

The present invention relates generally to visual recognition assistance devices for vehicles, and more particularly to an improved visual recognition assistance device which permits improved positional recognition of a fore end portion of a motor vehicle (i.e., which can enhance the so-called "bonnet end visibility" or "body end visibility" of the vehicle).

BACKGROUND ART

Many of the today's motor vehicles are constructed to assume a low bonnet height in order to improve design features and aerodynamic characteristics of the vehicles. In such motor cars, the fore end of the vehicle i.e., fore end of the bonnet) can hardly been seen, or can not be seen at all, from the driver's seat; on narrow streets and parking lots, however, there arises a need for the vehicle driver to accurately recognize a fore end position of the vehicle. Heretofore, corner poles have been known as visual recognition assistance device for allowing a human vehicle driver to easily grasp operational feelings of the vehicle. Japanese Patent Application Laid-Open Publication No. 2003-252121 discloses an example of a telescopically constructed corner pole.

Generally, in cases where the ground surface/road surface, on which tall buildings or other tall objects stand together in large numbers, is invisible from the driver's seat and thus there is little clue to positional recognition, a vehicle driver tends to lose a sense of distance due to a phenomenon commonly called "borrowed landscape effect", which is one of the optic illusions known from long ago in the field of the cognitive science.

The conventionally-known visual recognition assistance devices typically in the form of corner poles, including the one disclosed in the 2003-252121 publication, are constructed in such a manner that the vehicle driver in the driver's seat can not see the ground surface or vehicle body surface (i.e., bonnet and the like) and can only see a distal end portion of the corner pole. Although the distal end of the corner pole can be visually recognized, it is sometimes difficult for the vehicle driver to accurately and instantly recognize a distance to the corner pole due to loss of the sense of distance as noted above. Therefore, there has been a demand for a visual recognition assistance device which permits accurate and instant positional recognition of a fore end portion of a vehicle.

DISCLOSURE OF THE INVENTION

In view of the foregoing, it is an object of the present invention to provide an improved visual recognition assistance device for a vehicle which permits accurate and instant positional recognition of a fore end portion of the vehicle.

In order to accomplish the above-mentioned object, the present invention provides a visual recognition assistance device for a vehicle, which comprises: a pole section provided at a corner portion of the vehicle; a plate section provided at an intermediate portion or end portion of the pole section substantially in parallel relation to a ground surface.

In a preferred embodiment, the plate section is in any one of a disk shape, rectangular shape, triangular shape, kite shape and bar shape. Preferably, the plate section includes a pole-section-position indicating portion that has a shaped oriented toward the pole section to thereby point to the pole section in a highlighted fashion. Preferably, the pole-section-position indicating portion is in the form of any one of a recessed portion, colored portion, light-emitting portion, projecting portion and bar.

In a preferred embodiment, the plate section has two sides orthogonal to each other, and one of the two sides is substantially parallel to an imaginary front edge line of the vehicle while the other of the two sides is substantially parallel to an imaginary side edge line of the vehicle. Preferably, the plate section is provided at generally the same height as an instrument panel of the vehicle, the instrument panel having an upper surface substantially parallel to the ground surface. Preferably, the visual recognition assistance device further comprises a plurality of guide lines provided on the upper surface of the instrument panel and oriented toward the pole section.

In a preferred embodiment, at least one of the guide lines is oriented toward the same position as pointed to by the pole-section-position indicating portion. Preferably, the guide lines are formed by colored portions, recessed or projecting portions, or light-emitting portions provided on the upper surface of the instrument panel.

The present invention also provides a visual recognition assistance device for a vehicle, which comprises: an upper surface formed on an instrument surface of the vehicle substantially in parallel relation to a ground surface; and a plurality of guide lines provided on the upper surface of the instrument panel and oriented toward a corner portion of the vehicle.

According to the present invention, the provision of the plate section allows the vehicle driver to perceive or recognize the distal end of the pole section even where the ground surface is not visible. Further, the provision of the pole-section-position indicating portion can even further enhance the accuracy of the pole section position recognition. Furthermore, because the plate section has two sides extending substantially at right angles to each other, and one of the two sides is substantially parallel to the front edge line of the vehicle while the other of the two sides is substantially parallel to the side edge line of the vehicle, the front edge line and side edge line of the vehicle can be recognized with an increased ease, which can even further enhance the accuracy of the positional recognition. Furthermore, with the instrument panel having an upper surface parallel to the ground surface, the pole section position can be recognized with ease on the basis of the plate section and instrument panel. With the additional provision of the guide lines extending or oriented toward the pole section, the accuracy of the pole section position recognition can be even further enhanced. Namely, the present invention allows the driver to perceive the distance to the vehicle corner with an enhanced accuracy, by the provision of the plate section or pole-section-position indicating portion, the guide lines on the instrument panel, etc.

BRIEF DESCRIPTION OF DRAWINGS

FIG. 2 is a plan view of the visual recognition assistance device;

BEST MODE FOR CARRYING OUT THE INVENTION

Figure 1:
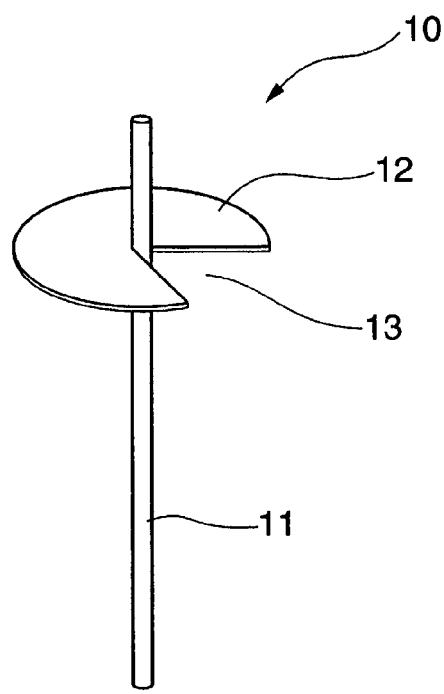
FIG. 1 is a perspective view explanatory of a corner pole that constitutes a principal part of a visual recognition assistance device for a vehicle according to an embodiment of the present invention.

FIG. 1 is a perspective view explanatory of a corner pole 10 that constitutes a principal part of a visual recognition assistance device for a vehicle according to an embodiment of the present invention.

As shown in FIG. 1, the corner pole 10 includes a pole section 11 and a plate section 12. The pole section 11 comprises a plurality of telescopically-connected rods of different diameters, and the plate section 12 is in the form of a thin circular plate (disk) with a substantially-sectorial recessed portion 13 formed therein.

In the instant embodiment, the pole section 11 is formed of metal similarly to the conventional corner poles, while the plate section 12 is formed of plastic to reduce its weight. However, the plate section 12 may be formed of any other suitable material than plastic, such as metal. The pole section 11 in its telescopically-expanded position has a length equal to or greater than the conventional corner poles. In view of the overall size of the vehicle, shape of a fore end portion of the bonnet, etc., the plate section 12 is formed into a diameter that is large enough to permit sufficient perception of the surface of the plate section 12 from the driver's seat but small enough to prevent deterioration in visibility of a region in front of the vehicle. In the instant embodiment, the plate section 12 has a 7 cm diameter. Later-described tests have shown that the optimal diameter of the plate section 12 is in the range of about 5 cm-10 cm. Further, in the illustrated example, the plate section 12 is colored red; however, it is desirable that the color of the plate section 12 be in any suitable color, such as yellow, standing out or highly noticeable against the ground surface or frontage road as the background, without being limited to red. Further, a suitable part of the recessed portion 13 of FIG. 1 may be colored in a highly noticeable color different from that of the remaining portion of the disk-shaped plate section 12.

FIG. 2 is a plan view explanatory of an installed position of the corner pole 10 on the vehicle. In FIG. 2 (and FIG. 4), the plate sections 12 (30, 40, 50 and 60) and bars (62, and 71, 72 and 73) are indicated in enlarged scale for convenience of explanation.

As seen in FIG. 2, the corner pole 10 is provided on a left front end (or left front corner) portion of the vehicle 14, similarly to the conventional counterparts. The plate section 12 has an upper surface substantially parallel to the ground surface and located at generally the same height as an instrument panel 15 of the vehicle, so that the human driver of the vehicle is allowed to effectively perform surface recognition and distance recognition on the basis of the plate section 12 and instrument panel 15.

In the embodiment of FIG. 2, the angle of the sectorial recessed portion 13 formed in the disk-shaped plate section 12 is determined on the basis of the following geometric considerations. Namely, a point B is set on a right rear edge of the instrument panel 15, and then a point C is set at an intersection between a line interconnecting an eye point E of the driver 16 and a point A (distal end) of the corner pole 10 and the rear edge of the instrument panel 15. Then, a point D is set at an intersection between a line extending rearwardly from the point A in parallel relation to an imaginary side edge line L1 of the vehicle and the left rear edge of the instrument panel 15. After these, the sectorial recessed portion 13 is formed in the plate section 12 in such a manner that one side R10 of the recessed portion 13 overlaps a line interconnecting the points A and B (hereinafter referred to as "A-B line") while the other side R11 overlaps a line interconnecting the points A and D (hereinafter referred to as "A-D line"). The recessed portion 13 is shaped to taper toward the pole section 11; it may be said that the recessed portion 13 is oriented toward the pole section 11 so that it can function as a pole-section-position indicating portion to point to the position of the pole section 11 in a highlighted fashion. The provision of such a pole-section-position indicating portion permits quicker and more accurate recognition of the pole section position.

Note that the "eye point E" is a driver's eye point determined when the driver's seat position has been set in accordance with a driver 16 of an average body size. As for Japanese, the "average body size" may be determined, for example, on the basis of "Japanese Body Size Data 1992-1994" containing parameters established by sufficient actual measurements and published by Research Institute of Human Engineering for Quality Life. To meet diversifying tastes of today's customers, the inventive arrangement (visual recognition assistance apparatus) or a motor vehicle employing the same may be provided in customized designs. In this instance, before the inventive arrangement or the vehicle employing it is manufactured, body size data may be obtained from a relevant customer, and this is followed by determining the position within the vehicle of an eye point E just fit for a third person having the same body size or the customer himself and then determining the position of the plate section 12 and the shape of the sectorial recessed portion 13.

The present invention, where the plate section 12 is disposed at substantially the same height as the instrument panel 15, can achieve a visual effect as if a surface generally parallel to the ground surface expanded from the instrument panel 15 to the plate section 12. As a consequence, the present invention can prevent a loss of the sense of distance as discussed above in relation to the conventional technique, so that it permits quicker and more accurate recognition of a distal end portion of the pole section 11; more specifically, the present invention allows the positions of the front surface and left end of the vehicle to be recognized with a considerably increased accuracy.

Figure 3:
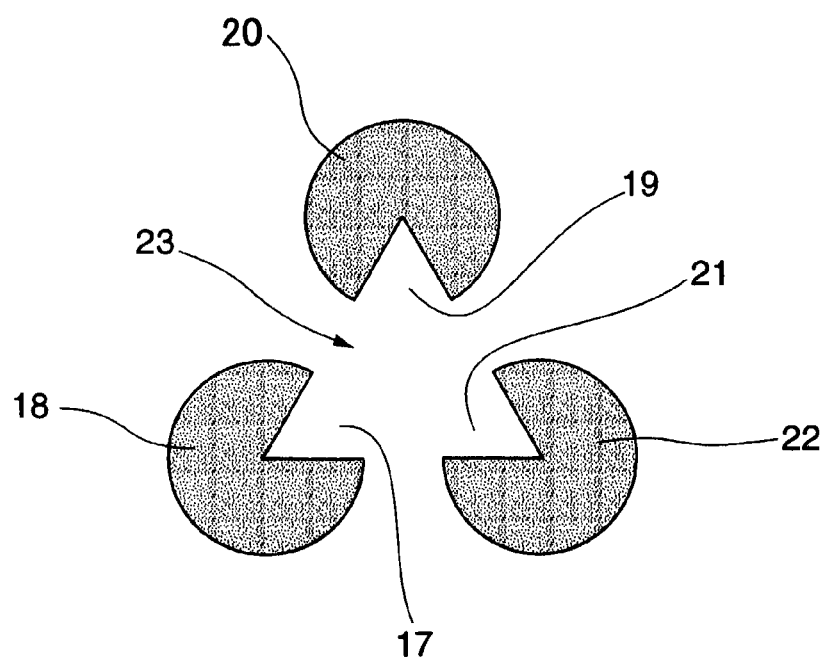
FIG. 3 is a diagram showing an optic illusion called "Cannizaro's triangle"

FIG. 3 is a diagram showing an optic illusion called "Cannizaro's triangle", which comprises a sector 18 having a recessed portion 17, a sector 19 having a recessed portion 20 and a sector 22 having a recessed portion 21. Triangle 23 that does not actually exist can be perceived in a center region of the diagram. The recessed portion 13 of the plate section 12 in the corner pole 10 of the invention is intended to achieve such an optic illusion effect, i.e. allow the vehicle driver to visually recognize intuitively that the distal end of the corner pole 10 is located at the vertex of the sectorial recessed portion 13. The instrument panel 15 has an upper surface substantially parallel to the ground surface, and a plurality of (e.g., three) lines L10, L11 and L12 are provided on the upper surface of the instrument panel 15 to indicate as if the corner pole 11 were located at an intersection among respective imaginary extensions of the lines L10, L11 and L12. In the instant embodiment, the corner pole 10 is disposed at the intersection among the imaginary extensions of the lines L10, L11 and L12; in the described embodiment, gray-colored lines, each having a 1 cm width, are provided on the instrument panel 15 along the lines L10, L11 and L12 (in the following description, individual sets of these lines L10, L11 and L12 and colored lines will be referred to as "guide lines" and represented by reference numerals L10, L11 and L12, to facilitate understanding).

The positional recognition of the distal end of the corner pole 10, located at the intersecting point of the imaginary extensions of the lines L10, L11 and L12, can be readily facilitated, not only by the shape of the recessed portion 13 but also by the direction of the line extending from the point A to the point C (i.e., A-C line), readily recognizable by the driver, and gradually-narrowing intervals among the lines L10, L11 and L12. Further, a small projection (e.g., in the form of a cylindrical projection having a 1 cm height and 1 cm diameter) may be provided at the point C, to allow the vehicle driver to intuitively recognize the directional position where the distal end of the corner pole 10 is located. Other indication, such as an arrow mark, than the small projection may be provided at the point C.

In the described embodiment, the gray-colored guide lines are provided on the upper surface of the instrument panel 15, focusing on the fact that, even where the bonnet is invisible from the driver's seat, the instrument panel 15 readily comes into sight of the driver even during driving of the vehicle. However, these guide lines on the instrument panel 15 may be indicated in any other suitable color than gray as long as the color is different from that of the upper surface of the instrument panel 15. In any case, it is desirable that the guide lines be in a color that is not readily reflected in a window glass of the vehicle; for example, where the upper surface of the instrument panel 15 is black, the guide lines are preferably drawn in gray. Further, the width of each of the guide lines is not limited to 1 cm and may be appropriately selected from a range of about 1 cm-10 cm to permit better visual recognition of the guide lines while maintaining a good appearance. If the guide line width is too great, the vehicle driver may erroneously recognize the guide line as a surface, so that the directional position where the corner pole 10 is located might be recognized with a reduced accuracy.

Alternatively, the guide lines L10, L11 and L12 may be formed on the surface of the instrument panel 15 as recessed or projecting portions (e.g., grooves or ridges), rather than mere colored lines. In another alternative, the guide lines may comprise combinations of a desired color and recessed or projecting portions. Further, in order to enhance the visibility at night, the guide lines L10, L11 and L12 on the instrument panel 15, plate section 14 and distal end portion of the pole section 12 may be painted with luminous paint, or may be illuminated with suitable illumination means, such as light bulbs and/or light emitting diodes. Namely, in an alternative, the guide lines L10, L11 and L12 on the instrument panel 15 may be provided as light-emitting portions. Furthermore, there may be provided an extra line (not shown) between the lines L11 and L12, to further enhance the visual recognition assistance effect or function.

FIGS. 4A-4E are plan views showing other embodiments of the visual recognition assistance device of the present invention.

Figure 4A:
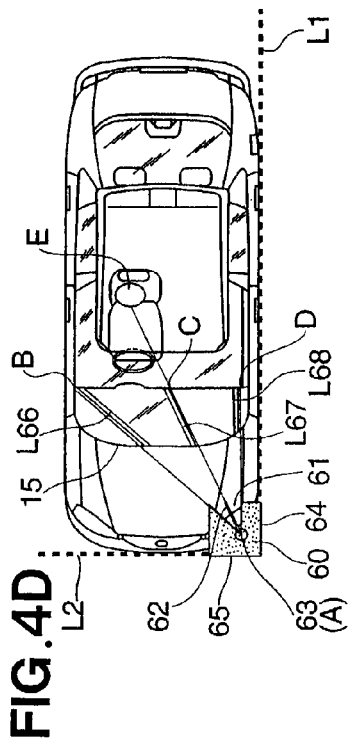
FIGS. 4A-4E are plan views showing other embodiments of the visual recognition assistance device of the present invention.

The visual recognition assistance device of FIG. 4A includes a plate section 30 similar to the plate section 12 of FIG. 1, and this plate section 30 is in the form of a square (or rectangular) plate having a triangular recessed portion 31. The recessed portion 31 has two sides overlapping the A-B line and A-D line, respectively, as in the embodiment of FIG. 2. Further, on the upper surface of the instrument panel 15, guide lines L35, L36 and L37 are provided in overlapped relation to the A-B line, A-C line and A-D line, respectively. Optimally, each side of the square plate section 30 has a length in the range of about 5 cm-10 cm, and the square plate section 30 has generally the same height as the upper surface of the instrument panel 15. In the illustrated example, the plate section 30 is colored red. In any case, it is desirable that the plate section 30 be colored in any suitable color, such as yellow, highly noticeable against the ground surface or frontage road, without being limited to red. The visual recognition assistance device of FIG. 4A also includes a pole section 32 which, similarly to the pole section 11 of FIG. 1, comprises a plurality of telescopically-connected rods of different diameters. The pole section 32 in its telescopically-expanded position has generally the same height as the upper surface of the instrument panel 15.

Alternatively, the guide lines L35, L36 and L37 may be formed on the surface of the instrument panel 15 as recessed or projecting portions (e.g., grooves or ridges), rather than mere colored lines. In another alternative, the guide lines L35, L36 and L37 may comprise combinations of a desired color and recessed or projecting portions. Further, in order to enhance the visibility at night, the guide lines L35, L36 and L37 on the instrument panel 15, plate section 30 and distal end portion of the pole section 32 may be painted with luminous paint, or may be illuminated with suitable illumination means, such as light bulbs and/or light emitting diodes. Namely, in an alternative, the guide lines L35, L36 and L37 on the instrument panel 15 may be provided as light-emitting portions. Furthermore, there may be provided an extra line (not shown) between the lines L36 and L37, to further enhance the visual recognition assistance effect or function.

Further, a suitable part of the recessed portion 31 may be colored in a highly noticeable color different from the color of the remaining portion of the square plate section 30. The recessed portion 31 is shaped to taper toward the pole section 32; it may be said that the recessed portion 31 is oriented toward the pole section 32 so that it can function as a pole-section-position indicating portion to point to the position of the pole section 32 in a highlighted fashion. Further, the plate section 30 has a side 33 vertically aligned with the vehicle side edge line L1 and another side 34 vertically aligned with the vehicle front edge line L2, so that the vehicle side edge line L1 and front edge line L2 can be recognized with an increased ease. As a result, the instant embodiment can even further enhance the positional recognition accuracy.

Figure 4B:
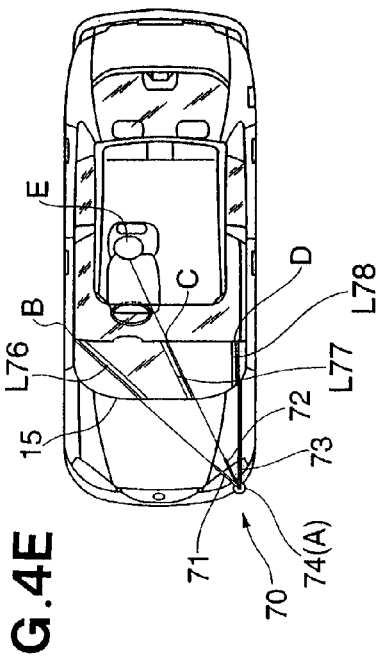

The visual recognition assistance device of FIG. 4B includes a plate section 40 similar to the plate section 30 of FIG. 4A, and this plate section 40 is in the form of a right-angled rectangular plate having a triangular recessed portion 41. The recessed portion 41 has two sides overlapping the A-B line and A-D line, respectively, as in the embodiment of FIG. 2. Further, on the upper surface of the instrument panel 15, guide lines L45, L46 and L47 are provided in overlapped relation to the A-B line, A-C line and A-D line, respectively. Optimally, two sides 43 and 44 forming the right angle of the right-angled rectangle each has a length in the range of about 5 cm-10 cm, and the plate section 40 has generally the same height as the upper surface of the instrument panel 15. In the illustrated example, the plate section 40 is colored red. In any case, it is desirable that the plate section 40 be colored in any suitable color, such as yellow, highly noticeable with the ground surface or frontage road, without being limited to red. The visual recognition assistance device of FIG. 4B also includes a pole section 42 which, similarly to the pole section 11 of FIG. 1, comprises a plurality of telescopically-connected rods of different diameters. The pole section 42 in its telescopically-expanded position has generally the same height as the upper surface of the instrument panel 15.

Alternatively, the guide lines L45, L46 and L47 may be formed on the surface of the instrument panel 15 as recessed or projecting portions (e.g., grooves or ridges), rather than mere colored lines. In another alternative, the guide lines L45, L46 and L47 may comprise combinations of a desired color and recessed or projecting portions. Further, in order to enhance the visibility at night, the guide lines L45, L46 and L47 on the instrument panel 15, plate section 40 and distal end portion of the pole section 42 may be painted with luminous paint, or may be illuminated with suitable illumination means, such as light bulbs and/or light emitting diodes. Namely, in an alternative, the guide lines L45, L46 and L47 on the instrument panel 15 may be provided as light-emitting portions. Furthermore, there may be provided an extra line (not shown) between the lines L46 and L47, to further enhance the visual recognition assistance effect or function.

Further, a suitable part of the recessed portion 41 may be colored in a highly noticeable color different from the color of the remaining portion of the right-angled triangular plate section 40. The recessed portion 41 is shaped to taper toward the pole section 42; it may be said that the recessed portion 41 is oriented toward the pole section 42 so that it can function as a pole-section-position indicating portion to point to the position of the pole section 42 in a highlighted fashion. Further, the side 43 of the plate section 40 is vertically aligned with the vehicle side edge line L1 and the side 44 is vertically aligned with the vehicle front edge line L2, so that the vehicle side edge line L1 and front edge line L2 can be recognized with an increased ease. As a result, the instant embodiment can even further enhance the positional recognition accuracy.

Figure 4C:
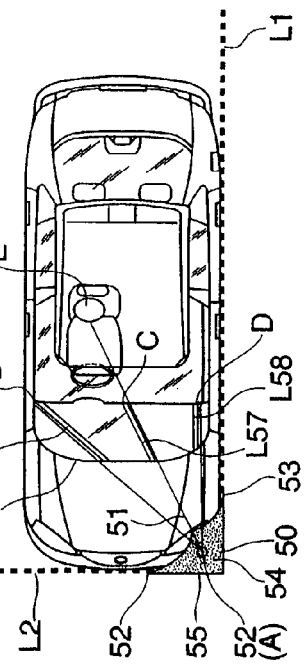

Further, the visual recognition assistance device of FIG. 4C includes a plate section 50 similar to the plate section 30 of FIG. 4B, and this plate section 50 is in the form of a kite-like plate having mountain-shaped projecting portions 51, 52 and 53 that project in the directions of the A-C line, front edge line L2 and side edge line L1, respectively. Further, on the upper surface of the instrument panel 15, guide lines L56, L57 and L58 are provided in overlapped relation to the A-B line, A-C line and A-D line, respectively. Optimally, the plate section 60 is sized in such a manner that a distance from a pole section 152 to the distal end of the projecting portion 51 or 53 is in the range of about 5 cm-10 cm, and the plate section 50 has generally the same height as the upper surface of the instrument panel 15. In the illustrated example, the plate section 50 is colored red. In any case, it is desirable that the plate section 50 be colored in any suitable color, such as yellow, highly noticeable with the ground surface or frontage road, without being limited to red. Similarly to the pole section 11 of FIG. 1, the pole section 152 comprises a plurality of telescopically-connected rods of different diameters. The pole section 152 in its telescopically-expanded position has generally the same height as the upper surface of the instrument panel 15.

Alternatively, the guide lines L56, L56 and L58 may be formed on the surface of the instrument panel 15 as recessed or projecting portions (e.g., grooves or ridges), rather than mere colored lines. In another alternative, the guide lines L56, L57 and L58 may comprise combinations of a desired color and recessed or projecting portions. Further, in order to enhance the visibility at night, the guide lines L56, L57 and L58 on the instrument panel 15, plate section 50 and distal end portion of the pole section 152 may be painted with luminous paint, or may be illuminated with suitable illumination means, such as light bulbs and/or light emitting diodes. Namely, in an alternative, the guide lines L56, L57 and L58 on the instrument panel 15 may be provided as light-emitting portions. Furthermore, there may be provided an extra line (not shown) between the lines L57 and L58, to further enhance the visual recognition assistance function.

Further, the projecting portions 51, 52 and 53 are shaped to cooperatively point to the position of the pole section 152; it may be said that the projecting portions 51, 52 and 53 are oriented toward the pole section 152 so that they can function as pole-section-position indicating portions to point to the position of the pole section 152 in a highlighted fashion. Further, the projecting portion 51 projecting toward the eye point E of the driver allows the driver to recognize the position of the pole section 152 with an even further enhanced accuracy. Furthermore, the plate section 50 has a side 54 vertically aligned with the vehicle side edge line L1 and a side 55 vertically aligned with the vehicle front edge line L2, so that the vehicle side edge line L1 and front edge line L2 can be recognized with an increased ease. As a result, the instant embodiment can even further enhance the positional recognition accuracy.

Figure 4D:
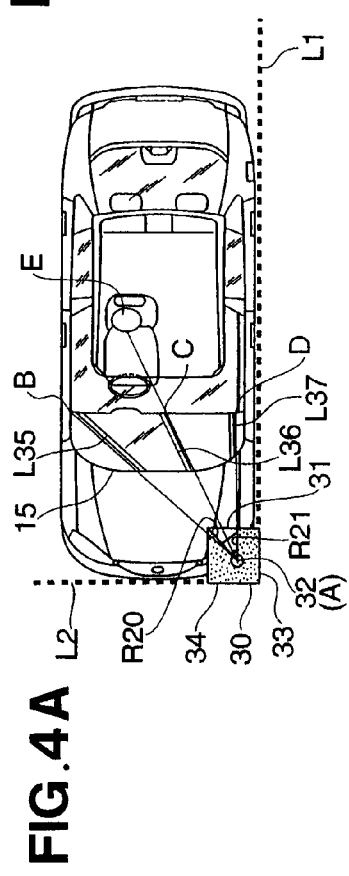

The visual recognition assistance device of FIG. 4D includes a plate section 60 similar to the plate section 30 of FIG. 4A, and this plate section 60 is in the form of a square (or rectangular) plate having a triangular recessed portion 61. A single bar 62 is provided in the recessed portion 61. The recessed portion 61 has two sides overlapping the A-B line and A-D line, respectively, as in the embodiment of FIG. 2, and the bar 62 extends in the direction of the A-C line. Further, on the upper surface of the instrument panel 15, guide lines L66, L67 and L68 are provided in overlapped relation to the A-B line, A-C line and A-D line, respectively. Optimally, each side of the square plate section 60 has a length in the range of about 5 cm-10 cm, and the square plate section 60 has generally the same height as the upper surface of the instrument panel 15. In the illustrated example, the plate section 60 and bar 62 are colored red. In any case, it is desirable that the plate section 60 and bar 62 be colored in any suitable color, such as yellow, highly noticeable with the ground surface or frontage road, without being limited to red. The visual recognition assistance device of FIG. 4D also includes a pole section 63 which, similarly to the pole section 11 of FIG. 1, comprises a plurality of telescopically-connected rods of different diameters. The pole section 63 in its telescopically-expanded position has generally the same height as the upper surface of the instrument panel 15. The bar 62 has a length in the range of about 5 cm-10 cm.

Alternatively, the guide lines L66, L67 and L68 may be formed on the surface of the instrument panel 15 as recessed or projecting portions (e.g., grooves or ridges), rather than mere colored lines. In another alternative, the guide lines L66, L67 and L68 may comprise combinations of a desired color and recessed or projecting portions. Further, in order to enhance the visibility at night, the guide lines L66, L67 and L68 on the instrument panel 15, plate section 60 and distal end portion of the pole section 63 may be painted with luminous paint, or may be illuminated with suitable illumination means, such as light bulbs and/or light emitting diodes. Namely, in an alternative, the guide lines L66, L67 and L68 on the instrument panel 15 may be provided as light-emitting portions. Furthermore, there may be provided an extra line (not shown) between the lines L67 and L68, to further enhance the visual recognition assistance function.

Further, a suitable part of the recessed portion 61 may be colored in a highly noticeable color different from the color of the remaining portion of the square plate section 60, and the bar 62 may be colored in still another color. Because the recessed portion 61 is shaped to taper toward the pole section 63 and the bar 62 extends toward the pole section 63, it may be said that the recessed portion 61 and bar 62 are oriented toward the pole section 63 so that they can function as pole-section-position indicating portions to point to the position of the pole section 63 in a highlighted fashion. Further, the bar 62 directed toward the eye point E of the driver allows the driver to recognize the position of the pole section 63 with an even further enhanced accuracy. In addition, the plate section 60 has a side 64 vertically aligned with the vehicle side edge line L1 and another side 65 vertically aligned with the vehicle front edge line L2, so that the vehicle side edge line L1 and front edge line L2 can be recognized with an increased ease. As a result, the instant embodiment can even further enhance the positional recognition accuracy.

Figure 4E:
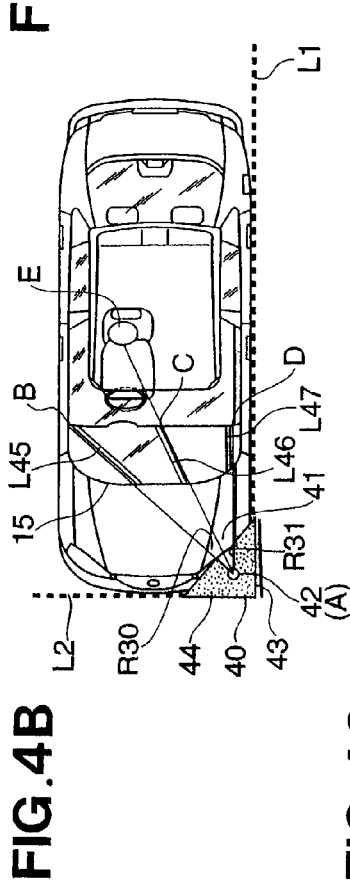

FIG. 4E shows still another embodiment of the visual recognition assistance device, where the corner pole 70 includes three bars 71, 72 and 73 extending in the directions of the A-B line, A-C line and A-D line, respectively. On the upper surface of the instrument panel 15, guide lines L76, L77 and L78 are provided in overlapped relation to the A-B line, A-C line and A-D line, respectively. In the illustrated example, the bars 71, 72 and 73 are colored red. In any case, it is desirable that the bars 71, 72 and 73 be colored in any suitable color, such as yellow, highly noticeable with the ground surface or frontage road, without being limited to red. Similarly to the pole section 11 of FIG. 1, a pole section 74 of the corner pole 70 comprises a plurality of telescopically-connected rods of different diameters. When the pole section 74 is in the telescopically-expanded position, the bars 71, 72 and 73 lie at generally the same height as the upper surface of the instrument panel 15. It may be said that the bars 71, 72 and 73 are oriented toward the pole section 74 so that they can function as pole-section-position indicating portions to point to the position of the pole section 74 in a highlighted fashion.

Alternatively, the guide lines L76, L77 and L78 may be formed on the surface of the instrument panel 15 as recessed or projecting portions (e.g., grooves or ridges), rather than mere colored lines. In another alternative, the guide lines L76, L77 and L78 may comprise combinations of a desired color and recessed or projecting portions. Further, in order to enhance the visibility at night, the guide lines L76, L77 and L78 on the instrument panel 15, bars 71, 72 and 73, and distal end portion of the pole section 74 may be painted with luminous paint, or may be illuminated with suitable illumination means, such as light bulbs and/or light emitting diodes. Namely, in an alternative, the guide lines L76, L77 and L78 on the instrument panel 15 may be provided as light-emitting portions. Furthermore, there may be provided an extra line (not shown) between the lines L77 and L78, to further enhance the visual recognition assistance function.

The aforesaid plate sections 12, 30, 40, 50 and 60 and the bars 71, 72 and 73 may be provided at the upper end of the corresponding pole sections rather than at an intermediate portion of the corresponding pole sections.

Figure 5:
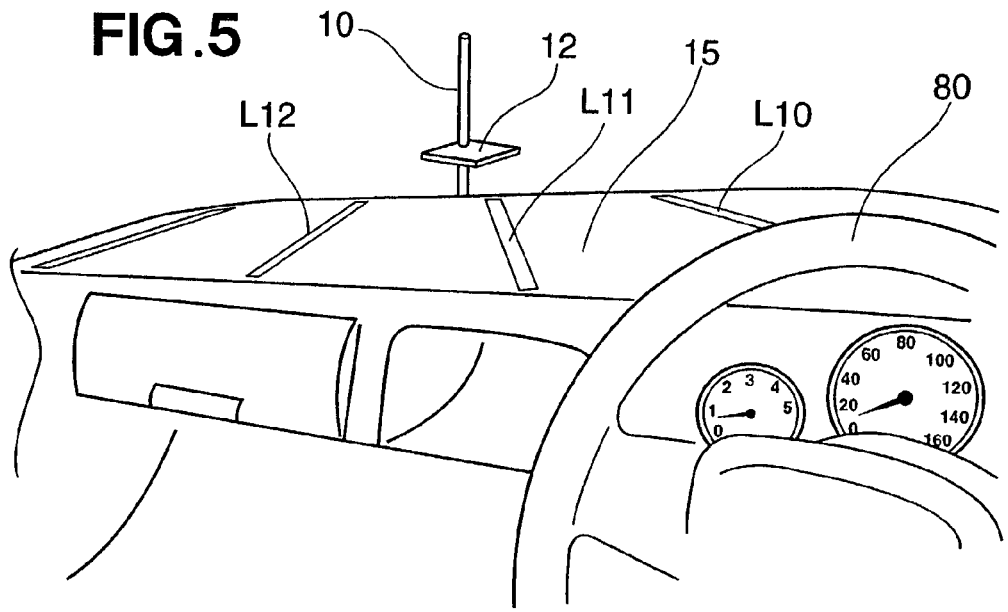
FIG. 5 is a view showing a corner area of the vehicle as viewed from inside the vehicle.

FIG. 5 shows the corner area of the vehicle as viewed from inside the vehicle 14, more specifically, from the driver seat. As shown, the vehicle driver can see a part of a steering wheel 80, instrument panel 15, three guide lines L10, L11 and L12, and corner pole 10 having the plate section 12.

Figure 6:
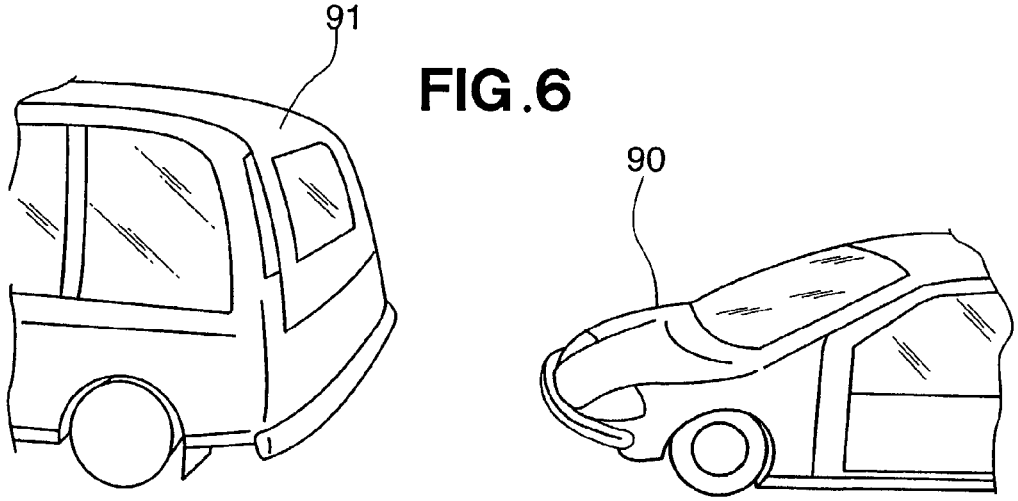
FIG. 6 is a view explanatory of a test where a conventional vehicle with no visual recognition assistance device was driven close to a stationary vehicle in front.
Figure 7:
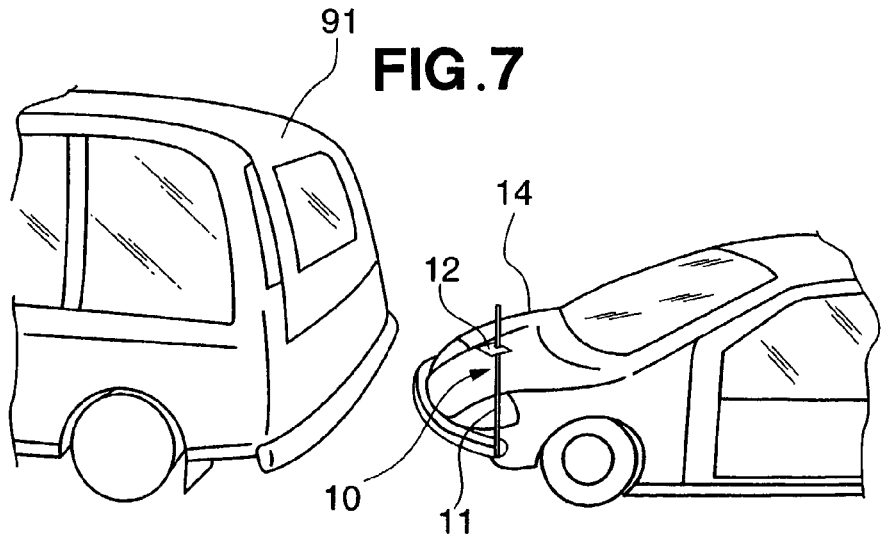
FIG. 7 is a view explanatory of a test where a vehicle equipped with the visual recognition assistance device of the present invention was driven close to a stationary vehicle in front.

FIG. 6 is a view explanatory of a test where a conventional vehicle 90 with no corner pole was driven close to a stationary (e.g., parked) vehicle 91 in front, and FIG. 7 is a view explanatory of a test where the vehicle 14 equipped with the visual recognition assistance device of the present invention was driven close to a stationary vehicle 91 in front. Namely, the vehicle 14 includes the corner pole 10. As can be seen from a comparison between FIGS. 6 and 7, the vehicle 14 equipped with the visual recognition assistance device of the present invention can be readily driven closer to the vehicle 91 in front than the conventional vehicle 90.

Two male test operators actually drove vehicles, equipped with various visual recognition assistance devices, as close to respective stationary vehicles in front as possible, after which respective advantageous results of these visual recognition assistance devices were checked quantitatively; the tests were performed in fair weather. More specifically, the test operators were each instructed to slowly drive each of various vehicles ("test vehicles") as close to the vehicle in front as possible as illustratively shown in FIG. 7 and then bring the vehicle to a stop at a time point when the driver judged that the vehicle could not safely travel any further, after which measurement was made of a distance between the rearmost end of the vehicle in front and the foremost end of the test vehicle having been stopped very close to the vehicle in front; for convenience of description, such a distance will hereinafter be referred to as "minimum vehicular gap". The tests showed that the test vehicles can be readily driven very close to the respective vehicles in front, and that the ease with which to drive the vehicles close to the respective vehicles in front increases as the bonnet end visibility increases.

Further, the test vehicles were generally similar to one another, except for the presence/absence or type of the visual recognition assistance device. Namely, the test vehicles used were: one equipped with no visual recognition assistance device (vehicle C1); one equipped with a conventional corner pole (vehicle C2); one which is equipped with no corner pole and where the instrument panel has a flat upper surface substantially parallel to the ground surface with no guide line or other guide indication provided on the upper surface (vehicle C3); one which is equipped with the corner pole 10 of the present invention and where the instrument panel has a flat upper surface substantially parallel to the ground surface with no guide line or other guide indication provided on the upper surface (vehicle C4); one which is equipped with no corner pole and where the instrument panel has a flat upper surface substantially parallel to the ground surface with a plurality of guide lines, extending toward the corner pole, provided on the upper surface (vehicle C5); and one which is equipped with the corner pole 10 of the present invention and where the instrument panel has a flat upper surface substantially parallel to the ground surface with a plurality of guide lines, extending toward the corner pole, provided on the upper surface (vehicle C6).

Figure 8:
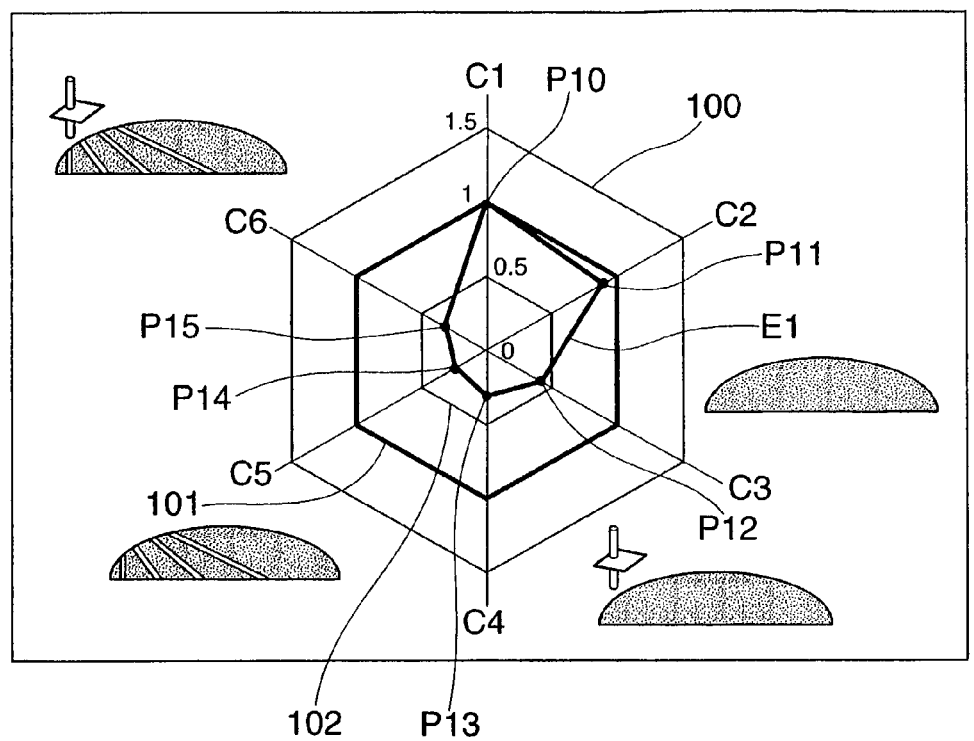
FIG. 8 is a radar chart showing results of the tests.
Figure 9:
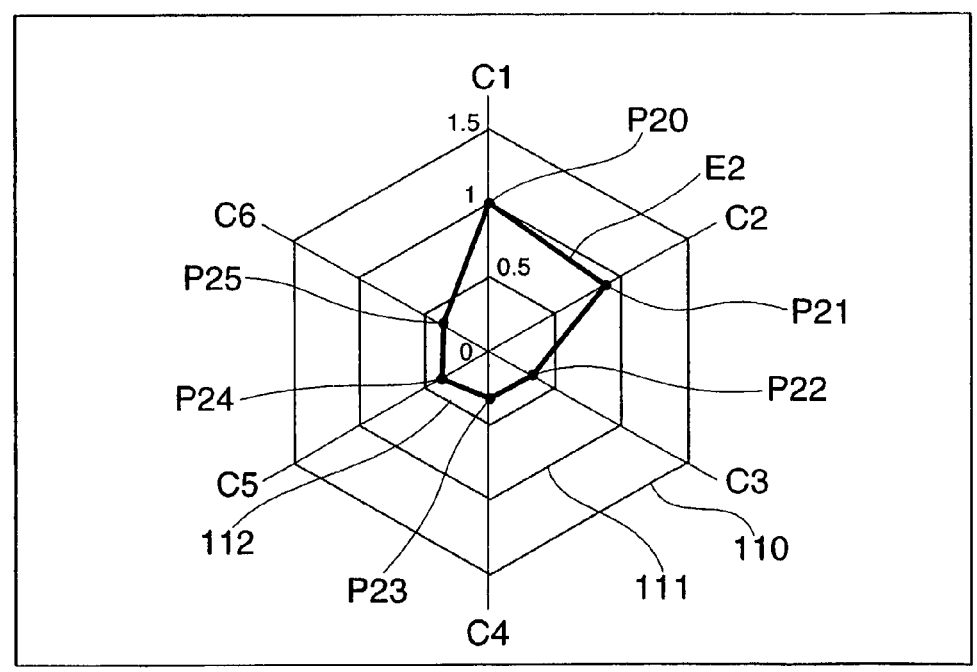
FIG. 9 is a radar chart showing results of the tests.

FIGS. 8 and 9 are radar charts showing results of the tests. With the learning effect taken into account, test operator A was instructed to drive vehicles C1, C2, . . . , vehicle C5 and C6, three times per vehicle, in the order named (i.e., in the order of ascending vehicle numbers, while test operator B was instructed to drive vehicles C6, C5, . . . , vehicle C2 and C1, three times per vehicle, in the order named (i.e., in the order of descending vehicle numbers). Then, an arithmetic average of the measured minimum vehicular gaps is calculated for each of the vehicles, and the thus calculated arithmetic averages are plotted on the radar charts of FIGS. 8 and 9.

FIG. 8 shows minimum vehicular gaps measured when test operator A drove each of the test vehicles as close to the vehicle in front as possible as illustrated in FIG. 7 and then brought the vehicle to a stop when the driver judged that the vehicle could not travel any further. In the figure, there are shown ratios, to the minimum vehicular gap attained by vehicle C1, of minimum vehicular gaps by the other vehicles. Namely, a hexagon 100 represents a value 1.5 indicative of a minimum vehicular gap that is 1.5 times greater than the minimum vehicular gap attained by vehicle C1. Another hexagon 101 represents a value 1 indicative of a minimum vehicular gap identical to that attained by vehicle C1. Still another hexagon 102 represents a value 0.5 indicative of a minimum vehicular gap equal to half of the minimum vehicular gap attained by vehicle C1.

Graph represented by a hexagon E1 shows the test results. Point P10 indicates the minimum vehicular gap attained by vehicle C1 that is set at a value "1". Point P11 represents a ratio of the minimum vehicular gap attained by vehicle C2 to the minimum vehicular gap attained by vehicle C1; although the ratio is slightly below "1", the minimum vehicular gap attained by vehicle C2 is almost equal to the minimum vehicular gap attained by vehicle C1. Point P12 represents a ratio of the minimum vehicular gap attained by vehicle C3 to the minimum vehicular gap attained by vehicle C1; in this instance, the ratio is smaller than 0.5, from which it can be seen that the minimum vehicular gap is considerably smaller than that attained by vehicle C1. Point P13 represents a ratio of the minimum vehicular gap attained by vehicle C4 to the minimum vehicular gap attained by vehicle C1; in this instance, the ratio is much smaller than 0.5, from which it can be seen that the minimum vehicular gap attained by vehicle C4 is considerably smaller than that attained by vehicle C1. Point P14 represents a ratio of the minimum vehicular gap attained by vehicle C5 to the minimum vehicular gap attained by vehicle C1; in this instance, the ratio is about 0.25, from which it can be seen that the minimum vehicular gap attained by vehicle C5 has significantly decreased as compared to that attained by vehicle C1. Point P15 represents a ratio of the minimum vehicular gap attained by vehicle C6 to the minimum vehicular gap attained by vehicle C1; in this instance, the ratio is about 0.3, from which it can be seen that the minimum vehicular gap attained by vehicle C6 has significantly decreased as compared to that attained by vehicle C1.

FIG. 9 shows minimum vehicular gaps measured when test operator B drove each of the test vehicles as close to the vehicle in front as possible and then brought the vehicle to a stop when the driver judged that the test vehicle could not travel any further. In the figure, there are shown ratios, to the minimum vehicular gap attained by vehicle C1, of minimum vehicular gaps by the other vehicles. Namely, a hexagon 110 represents a value 1.5 indicative of a minimum vehicular gap 1.5 times greater than the minimum vehicular gap attained by vehicle C1. Another hexagon 111 represents a value 1 indicative of a minimum vehicular gap identical to the minimum vehicular gap attained by vehicle C1. Still another hexagon 112 represents a value 0.5 indicative of a minimum vehicular gap equal to half of the minimum vehicular gap attained by vehicle C1.

Graph represented by a hexagon E2 shows the test results. Namely, point P20 indicates the minimum vehicular gap attained by vehicle C1 that is set at a value "1". Point P21 represents a ratio of the minimum vehicular gap attained by vehicle C2 to the minimum vehicular gap attained by vehicle C1; although the ratio is slightly below "1", the minimum vehicular gap attained by vehicle C2 is almost equal to the minimum vehicular gap attained by vehicle C1. Point P22 represents a ratio of the minimum vehicular gap attained by vehicle C3 to the minimum vehicular gap attained by vehicle C1; in this instance, the ratio is smaller than 0.5, from which it can be seen that the minimum vehicular gap attained by vehicle C3 is considerably smaller than that attained by vehicle C1. Point P23 represents a ratio of the minimum vehicular gap attained by vehicle C4 to the minimum vehicular gap attained by vehicle C1; in this instance, the ratio is about 0.3, from which it can be seen that the minimum vehicular gap attained by vehicle C4 is considerably smaller than that attained by vehicle C1. Point P24 represents a ratio of the minimum vehicular gap attained by vehicle C5 to the minimum vehicular gap attained by vehicle C1; in this instance, the ratio is about 0.3, from which it can be seen that the minimum vehicular gap attained by vehicle C5 has significantly decreased as compared to that attained by vehicle C1. Point P25 represents a ratio of the minimum vehicular gap attained by vehicle C6 to the minimum vehicular gap attained by vehicle C1; in this instance, the ratio is about 0.3, from which it can be seen that the minimum vehicular gap attained by vehicle C6 has significantly decreased as compared to that attained by vehicle C1.

As seen from FIGS. 8 and 9, vehicle C3 (where the instrument panel has a flat upper surface substantially parallel to the ground surface with no guide line or other guide indication provided on the upper surface), vehicle C4 (which is equipped with the corner pole 10 of the present invention and where the instrument panel has a flat upper surface substantially parallel to the ground surface with no guide line or other guide indication provided on the upper surface), vehicle C5 (where the instrument panel has a flat upper surface substantially parallel to the ground surface with a plurality of guide lines, directed toward the corner pole, provided on the upper surface) and vehicle C6 (which is equipped with the corner pole 10 of the present invention and where the instrument panel has a flat upper surface substantially parallel to the ground surface with a plurality of guide lines, directed toward the corner pole, provided on the upper surface) achieved 70 to 80% improvements in the measured minimum vehicular gap as compared with the conventional vehicle that is not equipped with the visual recognition assistance device of the present invention.

INDUSTRIAL APPLICABILITY

The visual recognition assistance device of the present invention can be advantageously used to achieve improved positional recognition of a fore end portion of a motor vehicle.

The invention claimed is:

1. A visual recognition assistance device for a vehicle, comprising:
   a pole section provided at a corner portion of the vehicle;
   a plate section provided at an intermediate portion or end portion of the pole section substantially in parallel relation to a ground surface,
   wherein the plate section includes a pole-section-position indicating portion that has a shape oriented toward the pole section to thereby point to a position of the pole section in a highlighted fashion.

2. A visual recognition assistance device for a vehicle, as claimed in claim 1, wherein the plate section is in any one of a disk shape, rectangular shape, triangular shape, kite shape and bar shape.

3. A visual recognition assistance device for a vehicle, as claimed ine44m3 claim 1, wherein the pole-section-position indicating portion is in the form of any one of a recessed portion, colored portion, light-emitting portion, projecting portion and bar.

4. A visual recognition assistance device for a vehicle as claimed in claim 1 wherein the plate section has two sides orthogonal to each other, and one of the two sides is substantially parallel to a front edge line of the vehicle while other of the two sides is substantially parallel to a side edge line of the vehicle.

5. A visual recognition assistance device for a vehicle, as claimed in claim 1, wherein the plate section is provided at generally same height as an instrument panel of the vehicle, and the instrument panel has an upper surface substantially parallel to the ground surface.

6. A visual recognition assistance device for a vehicle, as claimed in claim 5, which further comprises a plurality of guide lines provided on the upper surface of the instrument panel and oriented toward the pole section.

7. A visual recognition assistance device for a vehicle, as claimed in claim 6, wherein at least one of the plurality of guide lines is oriented in a direction identical to a direction highlighted by the pole-section-position indicating portion.

8. A visual recognition assistance device for a vehicle, comprising:
- an upper surface formed on an instrument surface of the vehicle substantially in parallel relation to a ground surface;
- a plurality of guide lines provided on the upper surface of the instrument panel and oriented toward a corner portion of the vehicles,
- a pole section provided at the corner portion of the vehicle; and
- a plate section provided on the pole section, the plate section being substantially parallel to the ground surface,
- wherein the plate section includes a pole-section-position indicating portion that has a shape oriented toward the pole section to thereby point to a position of the pole section in a highlighted fashion.

9. A visual recognition assistance device for a vehicle, as claimed in claim 6, wherein the plurality of guide lines are formed by colored portions, recessed or projecting portions, or light-emitting portions provided on the upper surface of the instrument panel.

10. A visual recognition assistance device for a vehicle, as claimed in claim 8, wherein the plurality of guide lines are formed by colored portions, recessed or projecting portions, or light-emitting portions provided on the upper surface of the instrument panel.

11. A visual recognition assistance device for a vehicle, as claimed in claim 8, wherein the pole-section-position indicating portion is in the form of any one of a recessed portion, colored portion, light-emitting portion, projecting portion and bar.

12. A visual recognition assistance device for a vehicle as claimed in claim 8 wherein the plate section has two sides orthogonal to each other, and one of the two sides is substantially parallel to a front edge line of the vehicle while other of the two sides is substantially parallel to a side edge line of the vehicle.

13. A visual recognition assistance device for a vehicle, comprising:
- a pole section provided at a corner portion of the vehicle;
- a plate section provided at an intermediate portion or end portion of the pole section, an upper surface of the plate section being substantially in parallel relation to a ground surface, wherein the plate section includes a pole-section-position indicating portion that has a shape oriented toward the pole section to thereby point to a position of the pole section in a highlighted fashion.

14. A visual recognition assistance device for a vehicle, as claimed in claim 13, wherein the pole-section-position indicating portion is in the form of any one of a recessed portion, colored portion, light-emitting portion, projecting portion and bar.

15. A visual recognition assistance device for a vehicle as claimed in claim 13 wherein the plate section has two sides orthogonal to each other, and one of the two sides is substantially parallel to a front edge line of the vehicle while other of the two sides is substantially parallel to a side edge line of the vehicle.

* * * * *